United States Patent
Vajravel et al.

(10) Patent No.: US 10,789,014 B2
(45) Date of Patent: Sep. 29, 2020

(54) PREVENTING CROSS-VOLUME FILE MOVES IN AN OVERLAY OPTIMIZER

(71) Applicant: Dell Products L.P., Round Rock, TX (US)

(72) Inventors: Gokul Thiruchengode Vajravel, Rayasandra Bengaluru (IN); Ankit Kumar, Deoghar (IN); Puneet Kaushik, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/057,702

(22) Filed: Aug. 7, 2018

(65) Prior Publication Data
US 2020/0050394 A1   Feb. 13, 2020

(51) Int. Cl.
*G06F 3/06* (2006.01)
*G06F 16/23* (2019.01)

(52) U.S. Cl.
CPC .......... *G06F 3/0659* (2013.01); *G06F 3/061* (2013.01); *G06F 3/0619* (2013.01); *G06F 3/0644* (2013.01); *G06F 3/0673* (2013.01); *G06F 16/2365* (2019.01)

(58) Field of Classification Search
CPC combination set(s) only.
See application file for complete search history.

(56) References Cited

U.S. PATENT DOCUMENTS

2012/0311263 A1* 12/2012 Kamath ................ G06F 3/0622
                                                         711/118

\* cited by examiner

*Primary Examiner* — Yong J Choe
(74) *Attorney, Agent, or Firm* — Kirton McConkie; Brian Tucker

(57) ABSTRACT

An overlay optimizer can prevent cross-volume moves to optimize the performance of a write filter. The overlay optimizer can be configured to detect when a file move is being attempted and can modify the handling of the file move so that a cross-volume move is not performed. In the case where the file move would result in a file being moved from the volume where the overlay cache is implemented, the overlay optimizer can create a copy of the target directory tree in the overlay cache and redirect the move to the newly created directory. In the case where the file move would result in a file being moved to the volume where the overlay cache is implemented, the overlay optimizer can forgo redirection so that the file will be moved within the same volume.

20 Claims, 17 Drawing Sheets

① As a result of the user's interactions, a folder, Dir2, containing a file, File1.txt, are stored in overlay 140

② The overlay-managing write filter moves the folder and file to the overlay cache but leaves a copy of the folder in the overlay ⑤ The moved folder and its contents will not be stored in the overlay cache

*Overlay Cache 240*
*(D:\ Volume)*

⑤ The overlay-managing write filter creates the target folder in the overlay cache and stores the moved file in the newly created folder

*Overlay Cache 240*
*(D:\ Volume)*

PREVENTING CROSS-VOLUME FILE MOVES IN AN OVERLAY OPTIMIZER

CROSS-REFERENCE TO RELATED APPLICATIONS

N/A

BACKGROUND

The Windows Embedded and Windows operating systems include functionality that can prevent the content of a storage medium from being changed. In a typical example, it may be desirable to prevent the operating system image, which may be stored on a particular disk partition or on flash media, from being changed at runtime. To accomplish this, Windows provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows write filter is static and cannot be changed without rebooting. For example, the UWF_OverlayConfig.SetMaximumSize function allows the size of the overlay, in megabytes, to be specified. However, when this function is called, it has no effect on the size of the overlay during the current session. Instead, the specified size of the overlay will not be applied until the next session.

One problem that results from the static size of the overlay is that the system will be automatically rebooted if the overlay becomes full. The user will not be presented with an option to reboot in this scenario. Over time, it is likely to become full and force the reboot of the system. As a result, the user experience can be greatly degraded when a write filter is employed. Also, if the size of the overlay is set too high, the system may not have enough RAM left to run multiple applications or even the operating system.

U.S. patent application Ser. No. 15/422,012, titled "Mechanism To Free Up The Overlay Of A File-Based Write Filter" (the '012 application) describes techniques for employing an overlay-managing write filter in conjunction with the write filter to monitor files that are stored in the overlay and move files that are not currently being accessed to thereby minimize the size of the overlay. If a request is made to access a moved file, the overlay-managing write filter can modify the request so that it targets the location of the moved file rather than the location of the original file on the protected volume. In this way, the fact that modified files are being moved from the overlay can be hidden from the write filter. As a result, the effective size of the overlay will be increased while still allowing the write filter to function in a normal fashion.

FIGS. 2 and 3 and the following discussion is taken from the description of the '012 application and is intended to provide an overview of one environment in which the present invention can be implemented. FIG. 2 is based on FIG. 1 and illustrates how an overlay-managing write filter 200 can be used in conjunction with write filter 110 to manage artifacts (e.g., files, folders, registry entries, etc.) that are stored in overlay 140. More particularly, overlay-managing write filter 200 can monitor which artifacts in overlay 140 are not currently being accessed and can move them to an overlay cache 240 on disk 100.

For purposes of this description, it will be assumed that overlay 140 and overlay cache 240 are implemented on two separate volumes. For example, overlay 140 can be implemented on the C: volume while overlay cache 240 can be implemented on the D: volume. Therefore, when overlay-managing write filter 200 moves an artifact from overlay 140 to overlay cache 240, it will be a cross-volume move. Also, if overlay cache 240 is implemented on a separate volume from the protected volume, write filter 110 will not modify any operations targeting overlay cache 240.

In some embodiments, this moving of artifacts can be carried out by employing a copy component 200a of overlay-managing write filter 200 that may preferably run in user mode. After moving an artifact to overlay cache 240, overlay-managing write filter 200 can cause the artifact to be discarded from overlay 140 thereby reducing the size of overlay 140 to prevent overlay 140 from becoming full. To ensure that the modifications that were made to the artifact are not lost, overlay-managing write filter 200 can monitor I/O requests to allow it to intercept a request to access an artifact that has been moved to overlay cache 240 and cause the request to be redirected to overlay cache 240. In this way, the fact that overlay-managing write filter 200 moves artifacts to overlay cache 240 will be hidden from write filter 110.

FIG. 3 provides an example of various components of overlay-managing write filter 200. As shown, overlay-managing write filter 200 can include a filtering component 201 and an overlay managing component 202. Filtering component 201 can generally represent the portion of overlay-managing write filter 200 that functions as a filter driver in the device stack for disk 100 (or, more specifically, in the stack for the protected volume). Accordingly, filtering component 201 can be configured to process IRPs that target artifacts on the protected volume. Importantly, because overlay-managing write filter 200 is positioned above write filter 110, filtering component 201 will be able to process these IRPs before they are handled by write filter 110.

Overlay managing component 202 can generally represent the portion of overlay-managing write filter 200 that is configured to interface with write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay-managing write filter 200 may be employed.

As shown in FIG. 3, overlay-managing write filter 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

As mentioned above, in typical implementations, moving an artifact between overlay 140 and overlay cache 240 will be a cross-volume operation. Unlike an inter-volume move which only requires updating the file system's data structure to reflect the new path within the volume, a cross-volume move requires creating a copy of the artifact on the target volume and deleting the artifact from the source volume. In a Windows implementation, the I/O manager 120 implements this copy and delete process using two IRP_MJ_CREATE operations—a first to open then delete the file on the source volume, and a second to create the file on the target volume. This process can be initiated by calling the MoveFile or other similar functions.

When a folder is moved, the folder and all of its contents, including subfolders and files, will be moved. If this move is a cross-volume operation, the copy and delete process will be performed on the folder and each of its contents. These cross-volume moves will therefore be slow and consume the CPU. Also, if a folder is moved from overlay cache 240 back to the protected volume, the folder and its contents will be stored in overlay 140 potentially consuming overlay 140 with the contents of the folder which are likely unmodified.

BRIEF SUMMARY

The present invention extends to methods, systems, and computer program products for preventing cross-volume moves when an overlay optimizer is employed to optimize the performance of a write filter. The overlay optimizer can be configured to detect when a file move is being attempted and can modify the handling of the file move so that a cross-volume move is not performed. In the case where the file move would result in a file being moved from the volume where the overlay cache is implemented, the overlay optimizer can create the target folder in the overlay cache and redirect the move to the created folder. In the case where the file move would result in a file being moved to the volume where the overlay cache is implemented, the overlay optimizer can forgo redirection so that the file will be moved within the same volume.

In some embodiments, the present invention is implemented by an overlay optimizer as a method for preventing a cross-volume move. The overlay optimizer can receive a second I/O operation for creating a file in a folder and determine that the second I/O operation represents a move operation such that the file to be created in the folder is a copy of a file that exists on a source volume. The overlay optimizer can also determine that the source volume is a protected volume that is protected from modification by a write filter, and determine that the folder exists on the source volume. If so, the overlay optimizer can cause the second I/O operation to be completed without performing a cross-volume move.

In other embodiments, the present invention can be implemented by an overlay optimizer that includes an overlay-managing write filter as a method for preventing a cross-volume move from being performed when a file is moved from a folder that exists on a protected volume to a folder that exists on an overlay cache implemented on a separate volume. This method can include: receiving a first I/O operation that attempts to open a file stored in a first folder; obtaining a process ID associated with the first I/O operation; determining a source volume where the file is stored and storing an association between the process ID and the source volume; receiving a second I/O operation that attempts to create a file in a second folder; obtaining a process ID associated with the second I/O operation; determining that the process ID associated with the second I/O operation matches the process ID associated with the first I/O operation; determining that the source volume is a protected volume; determining whether the second folder exists on the protected volume such that: when the second folder exists on the protected volume, the overlay optimizer allows the second I/O operation to create the file in the second folder on the protected volume; whereas when the second folder does not exist on the protected volume, the overlay optimizer redirects the second I/O operation to cause the file to be created in an overlay cache implemented on a separate volume.

In other embodiments, the present invention is implemented by an overlay optimizer that includes an overlay-managing write filter as a method for preventing a cross-volume move from being performed when a file is moved to a folder that exists on a protected volume from a folder that exists on an overlay cache implemented on a separate volume. This method can include: receiving a first I/O operation that attempts to open a file stored in a first folder; obtaining a process ID associated with the first I/O operation; determining a source volume where the file is stored and storing an association between the process ID and the source volume; receiving a second I/O operation that attempts to create a file in a second folder; determining that the second I/O operation is associated with the separate volume on which the overlay cache is implemented; obtaining a process ID associated with the second I/O operation; determining that the process ID associated with the second I/O operation matches the process ID associated with the first I/O operation; determining that the source volume is the protected volume; determining that the second folder exists on the protected volume; creating the second folder on the separate volume; and modifying the second I/O operation to cause the file to be created in the second folder on the separate volume rather than in the second folder on the protected volume.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
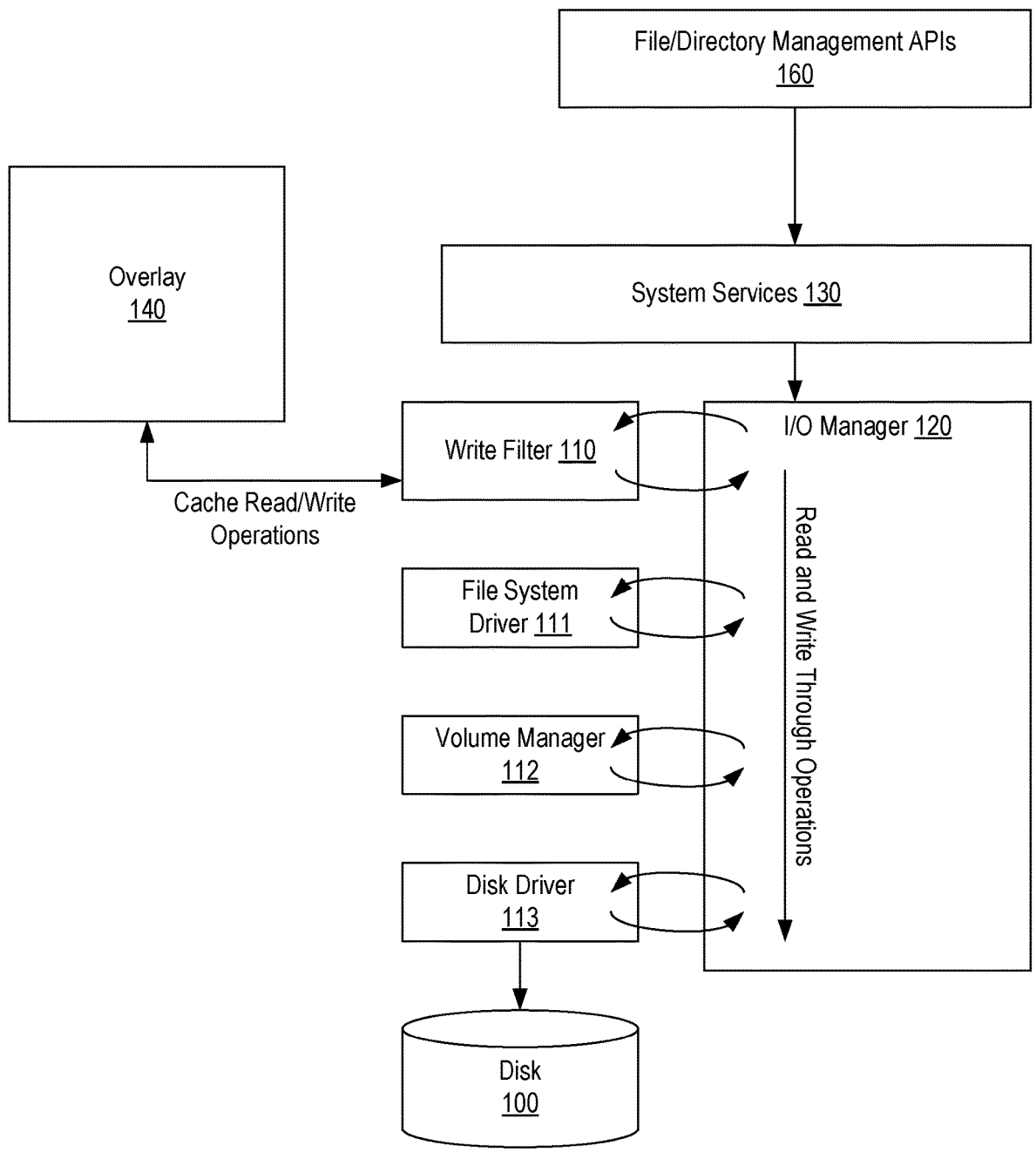
FIG. 1 illustrates a Windows-based I/O system in which a write filter is employed to redirect writes targeting a protected volume to an overlay.
Figure 2:
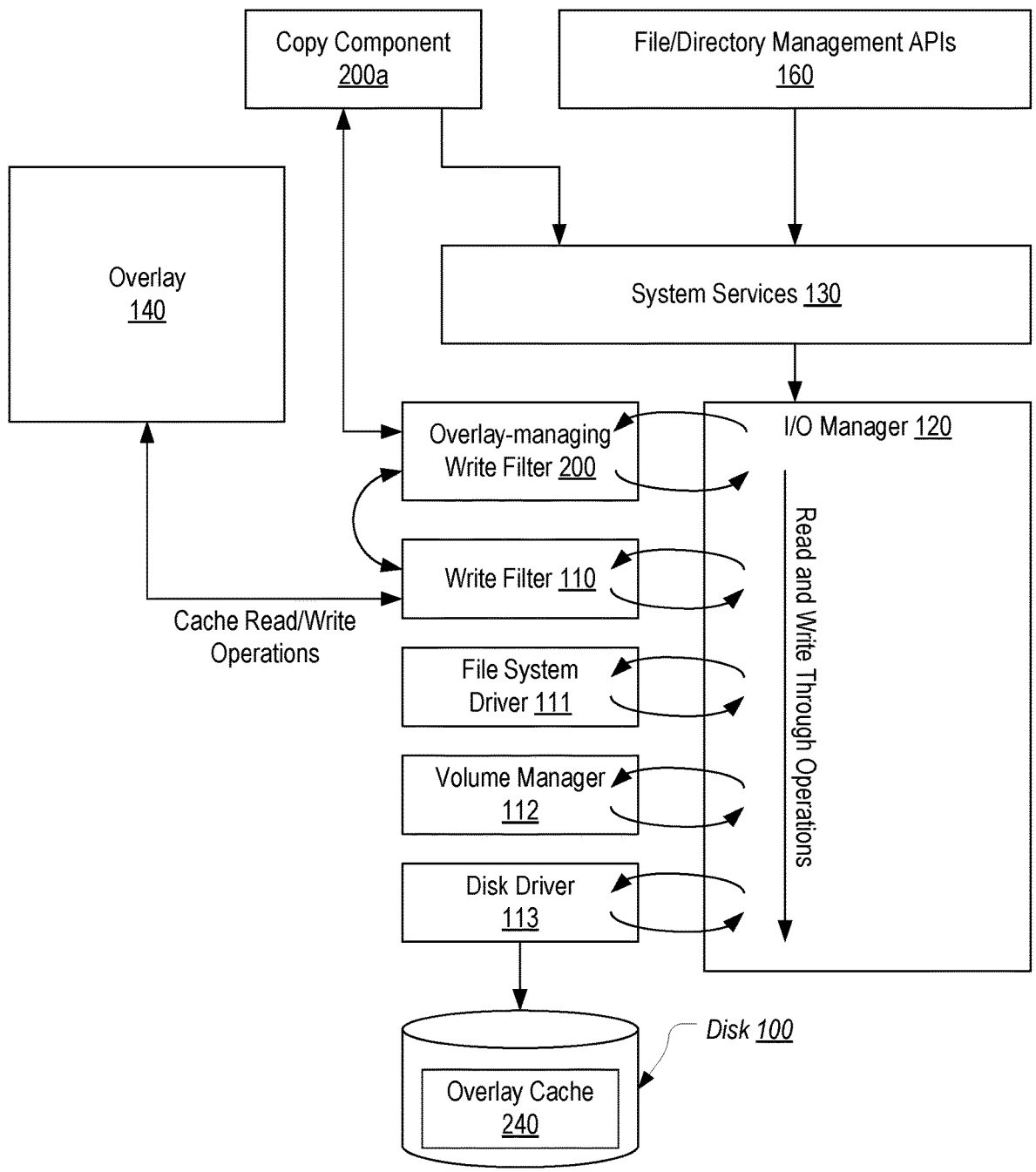
FIG. 2 illustrates how an overlay optimizer can be employed in conjunction with the write filter of FIG. 1 to free up the overlay.
Figure 3:
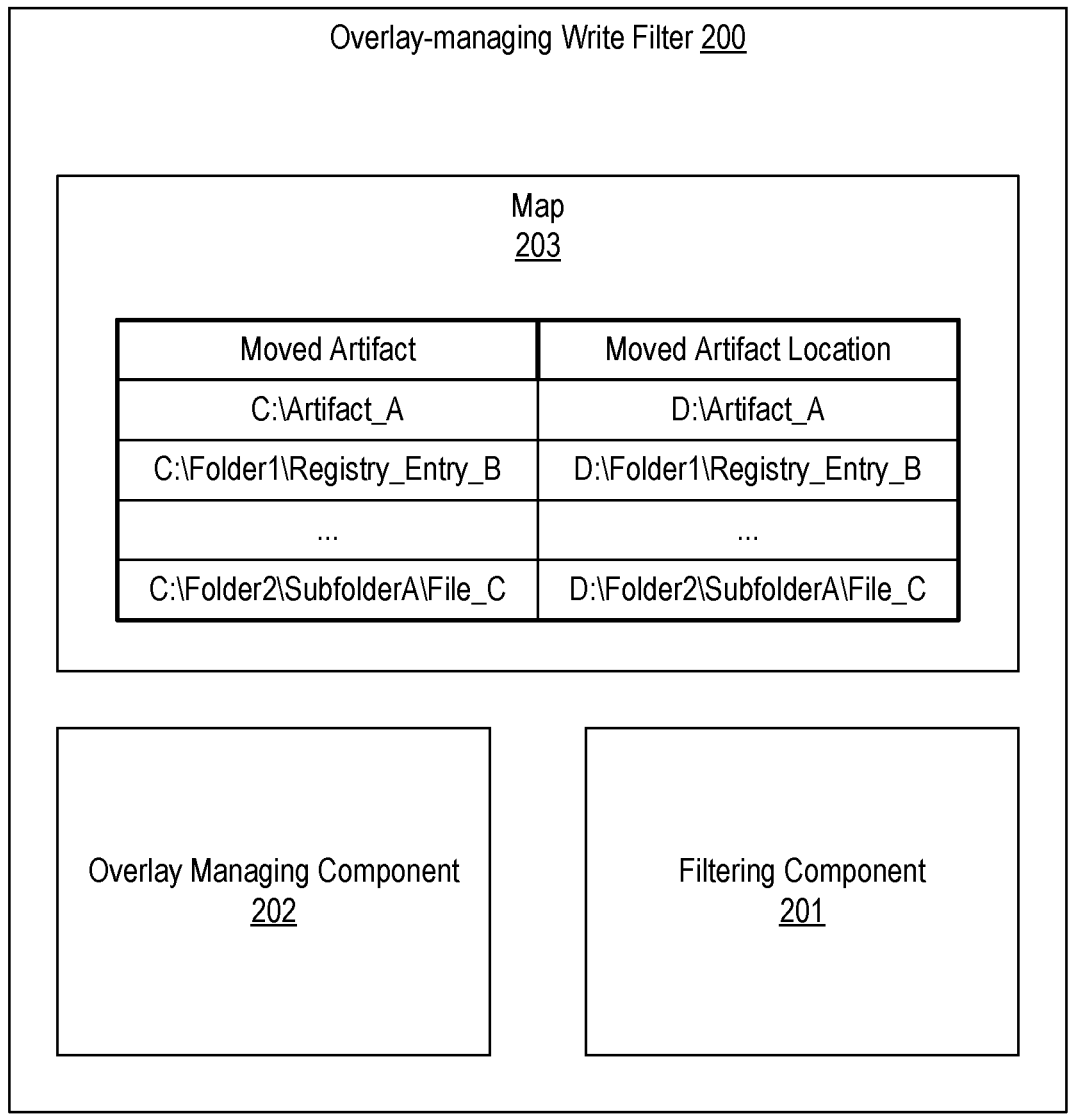
FIG. 3 illustrates various example components of an overlay optimizer.

Prior to describing the techniques of the present invention, an overview of how write filter 110 would handle a move will be provided. An understanding of this typical handling of file moves will assist with an understanding of how the present invention optimizes such moves. As introduced in the background, write filter 110 will redirect any attempt to modify the contents of a protected volume (hereinafter the C:\ volume) so that the modifications are maintained in overlay 140. In the case of an intra-volume file or folder move, overlay 140 will only need to maintain the modified path to the moved artifacts—i.e., write filter 110 will not create a copy of the moved artifact in overlay 140. Write filter 110 will then employ this modified path information that is stored in overlay 140 (e.g., in response to a directory enumeration operation) to give the appearance that the "moved" artifacts exist at the new location even though they were not actually moved on the C:\ volume (i.e., the file system's data structure will still maintain the original path to the artifacts but write filter 110 will cause relevant I/O operations to employ the modified path rather than the original path).

The difficulties with handling moves arise due to the overlay optimizing techniques that overlay-managing write filter 200 performs. For example, whenever a file or folder is modified and therefore stored in overlay 140, overlay-managing write filter 200 will move that file or folder to overlay cache 240 once all handles are closed. Accordingly, a folder may be stored in overlay cache 240 (which is assumed to be the D:\ volume) but will appear to the user as if it were a folder on the C:\ volume. The user may therefore move files and other folders to this folder that appears to be on the C:\ volume but that is actually stored on the D:\ volume. Similarly, the user may move files or folders from a folder that has been stored on the D:\ volume—a fact that the user would not be aware of—to a folder that exists on the C:\ volume. In either case, the cross-volume moves could be performed, but the system's performance will degrade and, in the case where a folder is moved from the D:\ volume to the C:\ volume, overlay 140 may be consumed by unmodified files (because I/O manager 120 would cause all the contents of the moved folder—not just the contents stored in overlay cache 240—to be copied and write filter 110 would redirect these copy operations to overlay 140). The present invention provides techniques for preventing these types of cross-volume file moves.

Figure 4A:
FIGS. 4A and 4B illustrate how the overlay optimizer can retain a folder in the overlay after files stored in the folder are moved to the overlay cache.
Figure 4A:
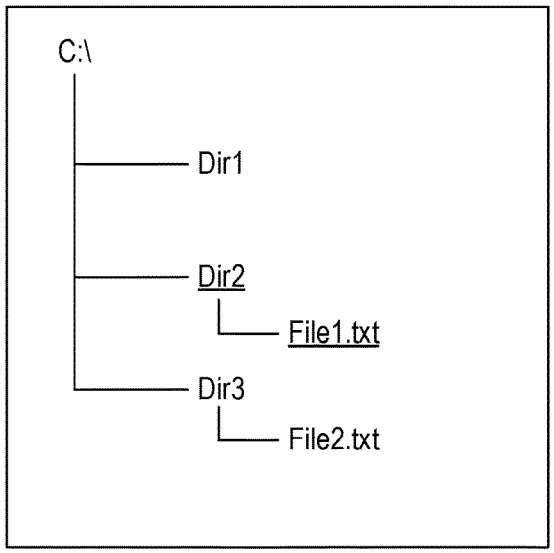
Figure 4A:
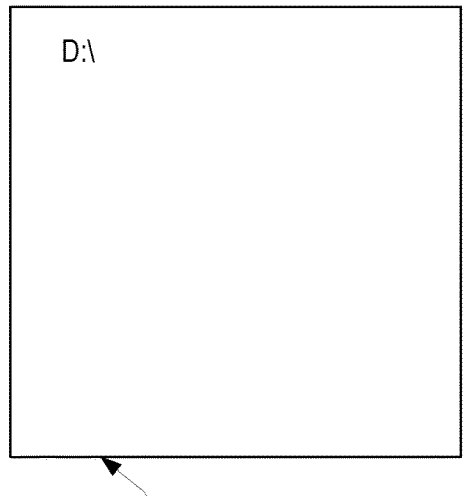
Figure 4B:
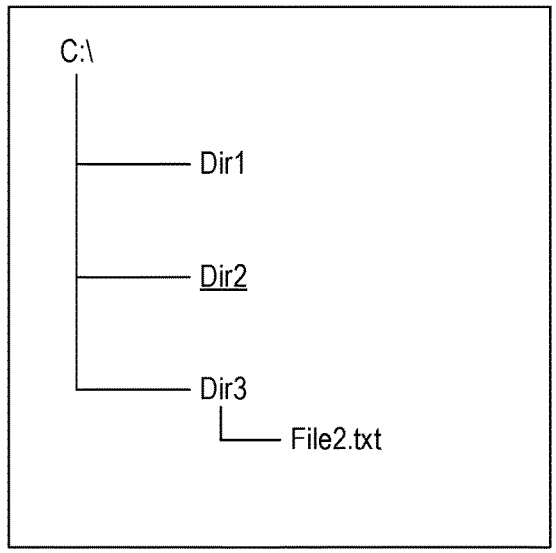
Figure 4B:
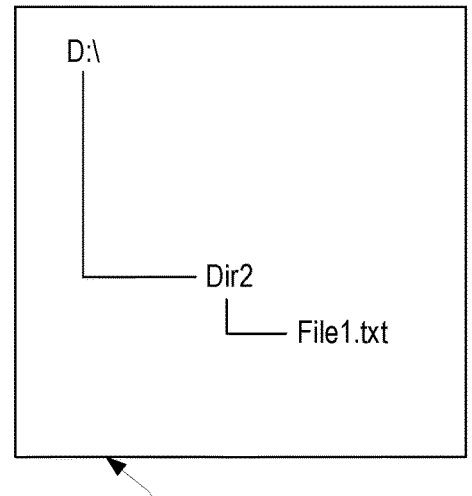

FIGS. 4A and 4B illustrate how overlay-managing write filter 200 can move a folder and its files from overlay 140 to overlay cache 240. For simplicity, these figures, as well as the subsequent figures, will represent the contents of the C:\ volume and the contents of overlay 140 as a single hierarchy (i.e., the merged view that write filter 110 would provide). However, artifacts that are stored in overlay 140 will be underlined within hierarchy. Of course, the hierarchy from the user's perspective would be modified to match whatever is stored in overlay cache 240 (i.e., the merged view that overlay-managing write filter 200 would provide). The specification and the claims make reference to a file or folder being stored or existing on the protected volume. Such references should be construed as including instances where the file or folder is stored in overlay 140.

As represented in step 1 of FIG. 4A, it is assumed that the user's interactions have caused a folder named Dir2 containing a file named File1.txt to be stored in overlay 140. For example, the user could have created a new folder and named it Dir2 or modified an existing folder named Dir2. Likewise, the user could have created a new file named File1.txt or modified a file named File1.txt. Regardless of how the folder, Dir2, and the file, File1.txt, came to be stored in overlay 140, overlay-managing write filter 200 will move the folder and file to overlay cache 240 in accordance with the process described in the background and as is represented in step 2 of FIG. 4B. However, in accordance with embodiments of the present invention, as part of moving a folder to overlay cache 240, overlay-managing write filter 200 can forgo deleting the folder from overlay 140 such that a Dir2 folder exists in both overlay cache 240 and overlay 140. The Dir2 folder will therefore exist on the protected volume even though it has been moved (or copied) to overlay cache 240. The rationale for leaving the Dir2 folder in overlay 140 will become apparent below. In contrast, overlay-managing write filter 200 will delete files that are moved from overlay 140 as is represented in FIG. 4B.

FIGS. 5A-5E illustrate how overlay-managing write filter 200 can detect that a file is being moved across volumes and can prevent the cross-volume move. FIGS. 5A-5E provide an example where a file, File2.txt, is being moved from a folder, Dir3, on the C:\ volume to a folder Dir2 that exists in overlay cache 240 which is assumed to be the D:\ volume. Although this scenario assumes File2.txt and Dir3 are not stored in overlay 140 (i.e., the file/folder have not been modified prior to the move), the same processing would be performed if File2.txt and/or Dir3 were stored in overlay 140.

As addressed in the background, a cross-volume move operation will involve two IRP_MJ_CREATE operations. However, I/O manager 120 does not provide any indication that the two IRP_MJ_CREATE operations are related. Overlay-managing write filter 200 can be configured to implement a process for linking the two IRP_MJ_CREATE operations so that it can employ information from the first IRP_MJ_CREATE operation to detect and prevent a cross-volume move.

Figure 5A:
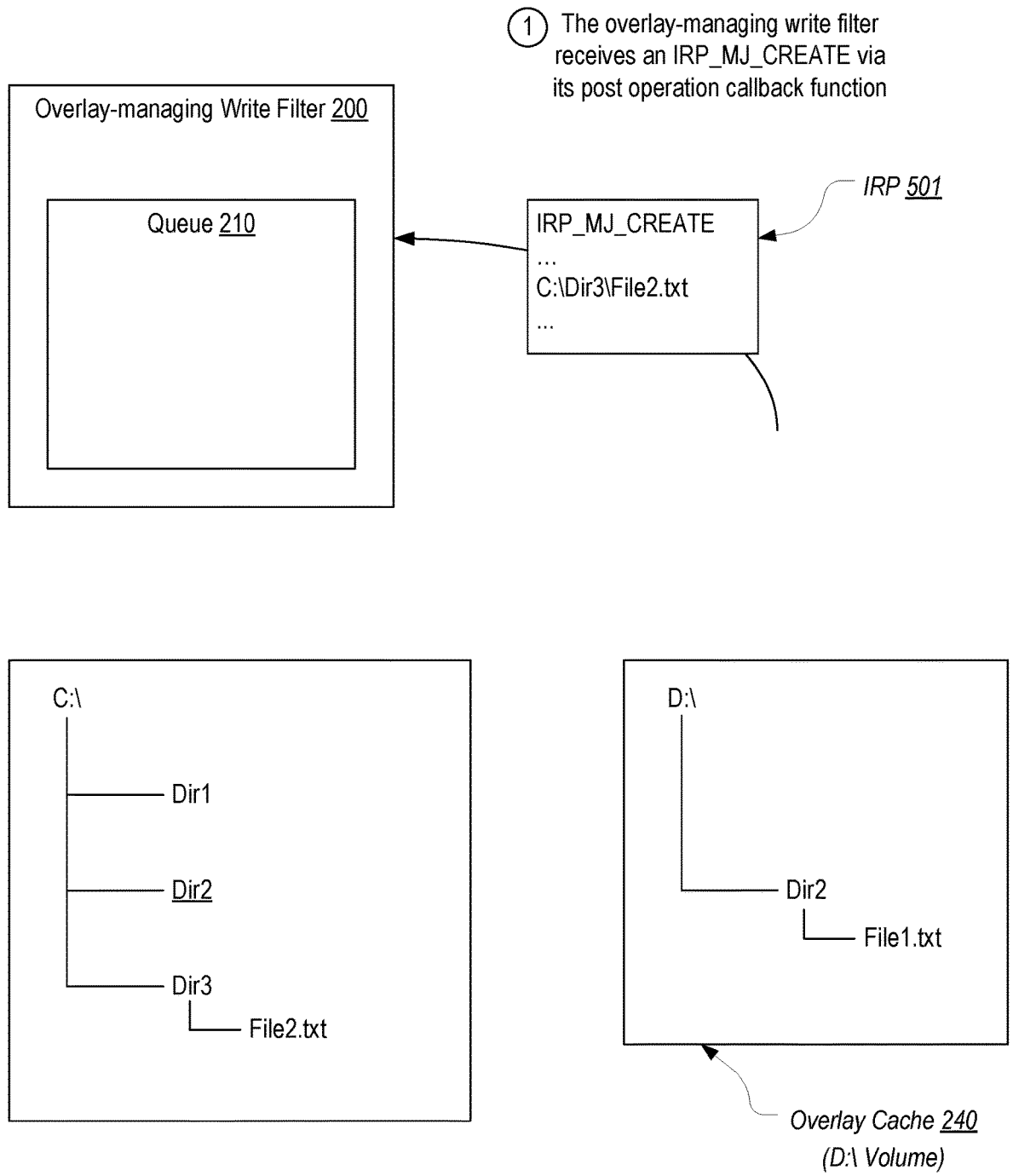
FIGS. 5A-5E illustrate how the overlay optimizer can detect and prevent a cross-volume move when the user has attempted to move a file to a folder in the overlay cache.

In step 1 shown in FIG. 5A, an IRP 501 is passed to overlay-managing write filter 200 as the IRP ascends the file system stack. In other words, in step 1, I/O manager 120 (or more specifically, the filter manager of I/O manager 120) passes IRP 501 to overlay-managing write filter 200's post operation callback function that is registered for IRP_MJ_CREATE operations. As is known, an IRP_MJ_CREATE operation can open or create a file identified by the path or filename specified in the IRP. In this example, it will be assumed that IRP 501 provides a path of C:\Dir3\File2.txt and will therefore open that file as it exists on the protected volume.

Figure 5B:
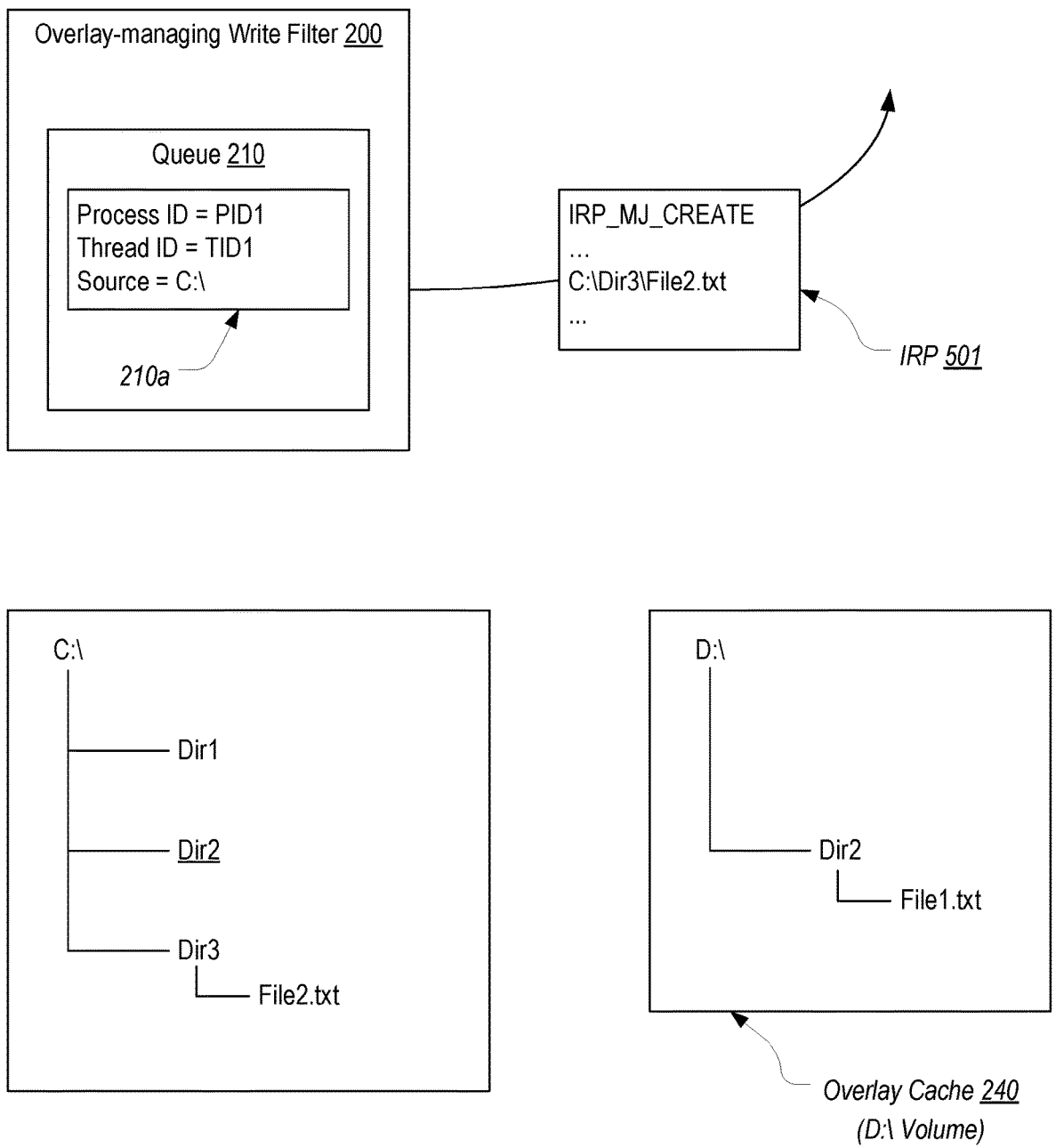

Turning to FIG. 5B, as part of its post operation callback function for IRP_MJ_CREATE operations and as represented in step 2, overlay-managing write filter 200 can obtain the thread ID and process ID of the process that initiated IRP 501. Any suitable technique can be employed to obtain these IDs including, for example, obtaining the thread ID from the Tail.Overlay.Thread field of IRP 501 and then using the IoThreadToProcess API to obtain the process ID from the thread ID. By employing the thread ID to obtain the process ID, overlay-managing write filter 200 can ensure that the originating process, and not some intermediary process such as another filter, will be identified. Overlay-managing write filter 200 can also determine the source volume for IRP 501 (e.g., from a fully qualified object name or from the directory specified in the accompanying Object Attributes structure). Overlay-managing write filter 200 can then store an entry 210a in queue 210 that maps the process ID and thread ID to the source volume. In this example, it will be assumed that the process ID and thread ID associated with IRP 501 are PID1 and TID1 respectively. Also, because IRP 501 targets C:\Dir3\File1.txt, the source volume will be C:\.

Figure 5C:
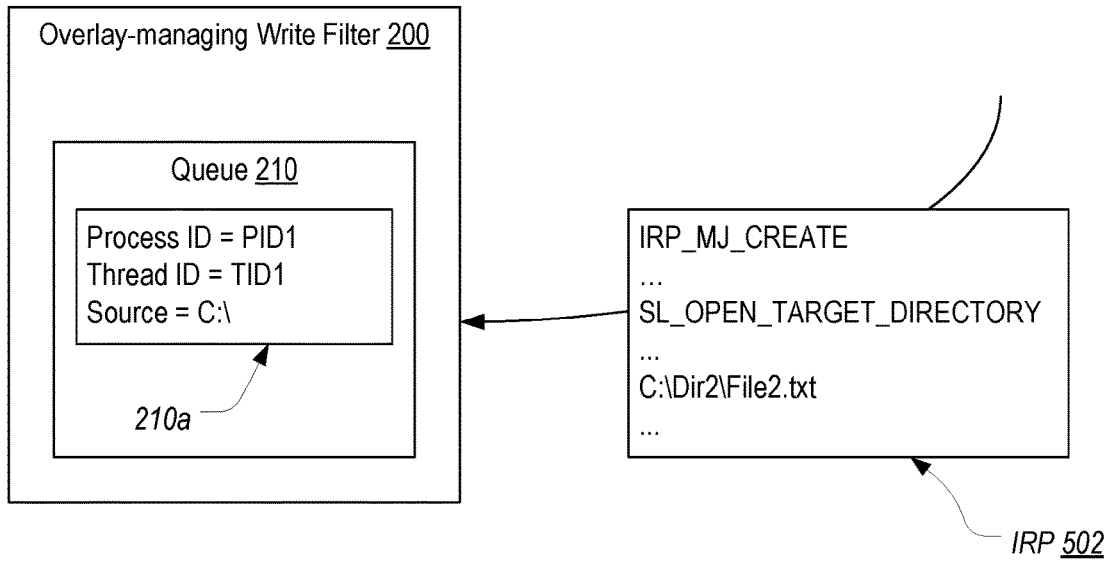
Figure 5C:
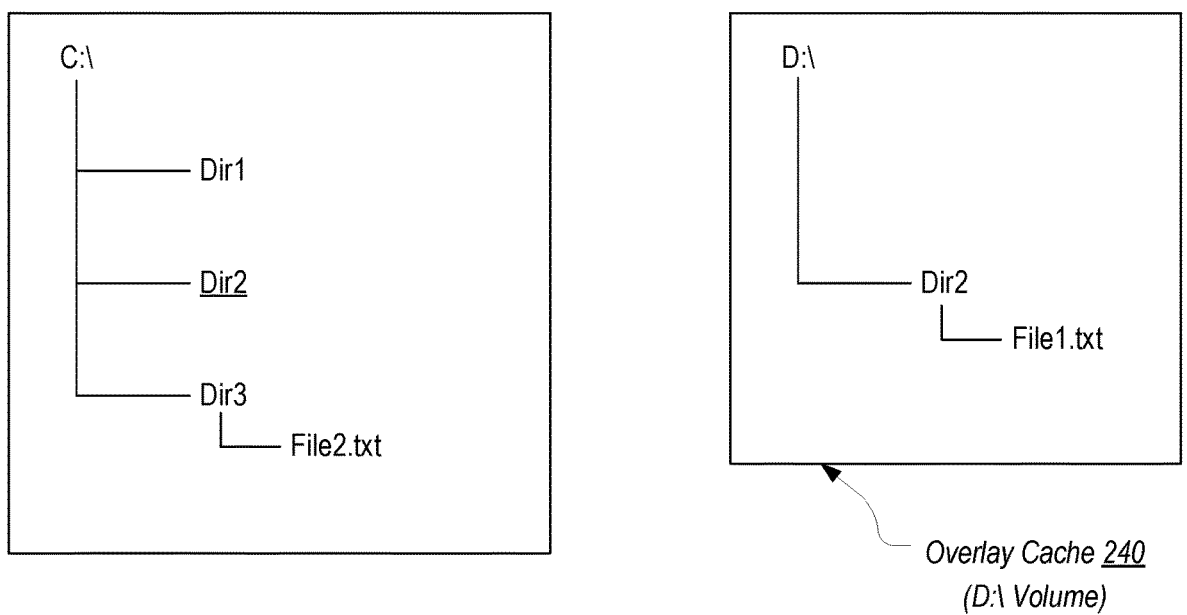

Turning to FIG. 5C, because IRP 501 is part of a move operation, at some point, overlay-managing write filter 200 will receive the second IRP which attempts to create the file in the target folder, C:\Dir2. Accordingly, in step 3, IRP 502 is passed to overlay-managing write filter 200's pre operation callback function for IRP_MJ_CREATE operations.

As part of this pre operation callback function, overlay-managing write filter 200 can first determine whether IRP 502 is the second IRP_MJ_CREATE operation of a move. This can be accomplished by determining whether the SL_OPEN_TARGET_DIRECTORY flag is set within IRP 502. I/O manager 120 sets this flag in the second IRP_MJ_CREATE operation of a move—i.e., in the IRP_MJ_CREATE that attempts to create the file in the target folder. Because this flag is set in IRP 502, overlay-managing write filter 200 can then employ the entries in queue 210 to identify the source volume for the move operation of which IRP 502 forms a part.

Figure 5D:
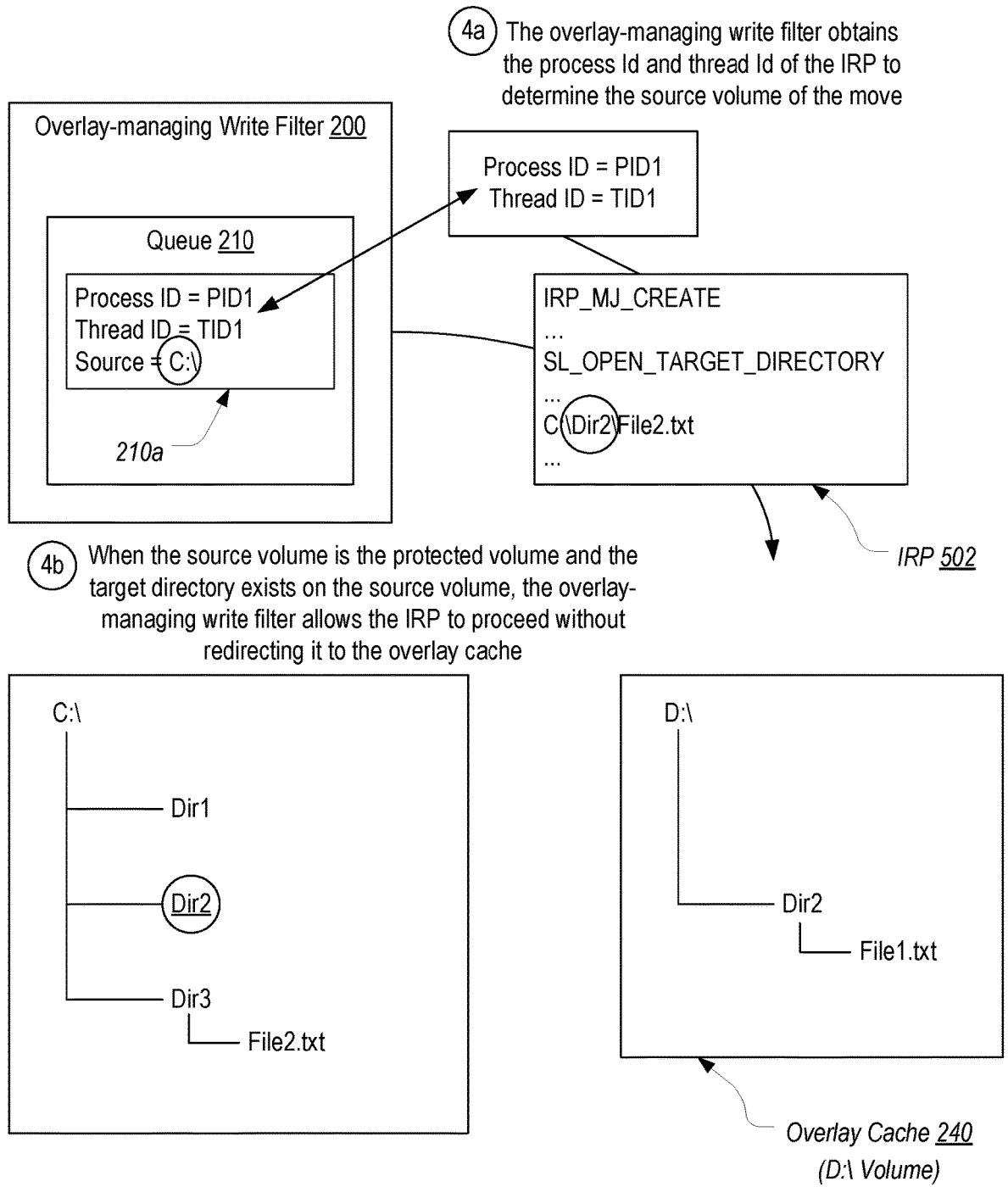

For example, in step 4a shown in FIG. 5D, overlay-managing write filter 200 can obtain the thread ID and the process ID of the process that initiated IRP 502. In this case, the process ID and thread ID will be PID1 and TID1 respectively. With this thread ID and process ID, overlay-managing write filter 200 can search queue 210 for a matching entry and will therefore locate entry 210a. Entry 210a will inform overlay-managing write filter 200 that the source volume for this move is the C:\ volume. More specifically, entry 210a will inform overlay-managing write filter 200 that File2.txt that is being created at C:\Dir2 is actually being moved from the C:\ volume.

Upon determining that IRP 502 pertains to a move operation where the source volume is the protected volume (i.e., the C:\ volume), overlay-managing write filter 200 can then determine whether the target folder exists on the source volume. In this example, the target folder of IRP 502 is C:\Dir2. Therefore, overlay-managing write filter 200 can determine whether a folder named Dir2 exists on the C:\ volume. This can be accomplished by attempting to open the directory on the source volume. For example, overlay-managing write filter 200 could call FltCreateFileEx2 or any of the similar functions and use C:\Dir2 as the directory to be opened. If the specified directory is opened in response to this call, overlay-managing write filter 200 will know that the target folder of IRP 502 exists on the source volume.

Therefore, in step 4b, overlay-managing write filter 200 can pass IRP 502 down the stack without redirecting it to overlay cache 240. As a result, as represented in step 5 of FIG. 5E, File2.txt will not be created in overlay cache 240 but will be moved to Dir2 on the source volume by virtue of an update to the file system data structure for the C:\ volume. Notably, the target folder, Dir2, exists in overlay cache 240, and therefore, under typical processing, overlay-managing write filter 200 would have redirected IRP 502 to overlay cache 240 (e.g., by modifying the file name to be D:\Dir2\File2.text). However, by determining that IRP 502 pertains to a move and then forgoing redirection, overlay-managing write filter 200 prevents a copy of File2.txt from being created on the D:\ volume.

Figure 5E:
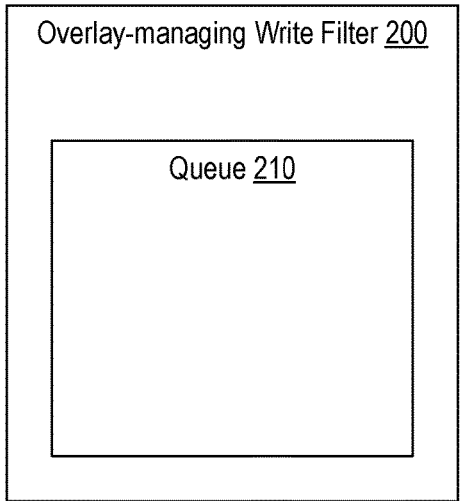
Figure 5E:
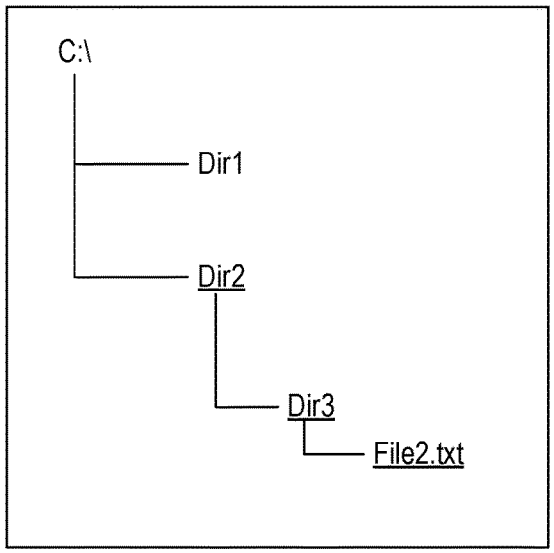
Figure 5E:
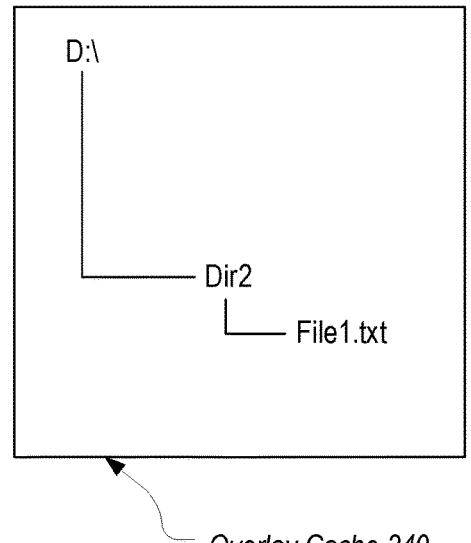

As shown in FIG. 5E, it is assumed that the move of File2.txt was part of a move of the entire folder Dir3. For simplicity, Dir3 is shown as including a single file. However, in cases where Dir3 includes many files and/or subfolders, the move of the folder to Dir2 would involve copying many files across volumes if overlay-managing write filter 200 did not perform the techniques for preventing such cross-volume moves. It can therefore be seen that the present invention can greatly reduce the amount of processing that would be otherwise be required when moving folders in systems that employ an overlay optimizer.

FIGS. 6A-6E illustrate a similar process that overlay-managing write filter 200 can perform to detect when a file stored in overlay cache 240 is being moved across volumes and to prevent these cross-volume moves. These figures therefore represent a move in the reverse direction from what was shown in FIGS. 5A-5E. Again, the user will be unaware that such moves are cross-volume moves. To provide context, it will be assumed that the move depicted in FIGS. 6A-6E occurs after the move depicted in FIGS. 5A-5E.

Figure 6A:
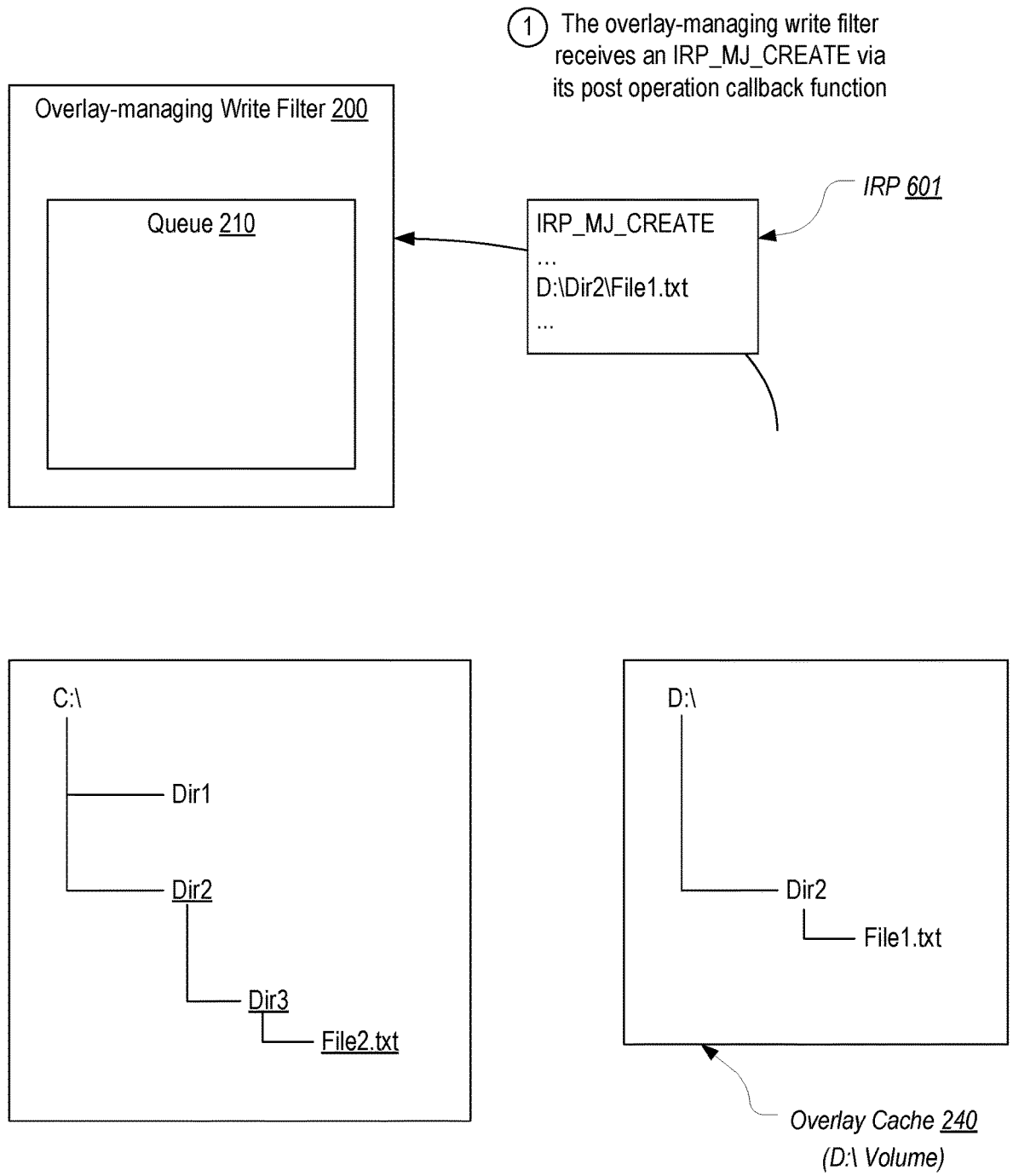
FIGS. 6A-6E illustrate how the overlay optimizer can detect and prevent a cross-volume move when the user has attempted to move a file that is stored in the overlay cache to a folder on the protected volume.

Step 1 shown in FIG. 6A is largely the same as step 1 of FIG. 5A. In particular, an IRP 601 is passed to overlay-managing write filter 200's post operation callback function. In this example, it is assumed that the user has moved the folder, Dir2, to the folder, Dir1, and that IRP 601 represents the first IRP_MJ_CREATE operation for opening File1.txt that is assumed to be stored at C:\Dir2 but that is actually stored at D:\Dir2.

Figure 6B:
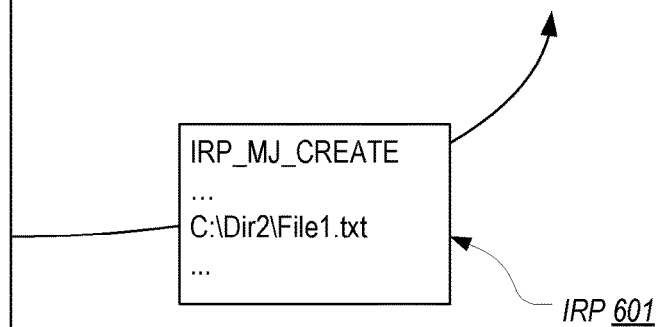
Figure 6B:
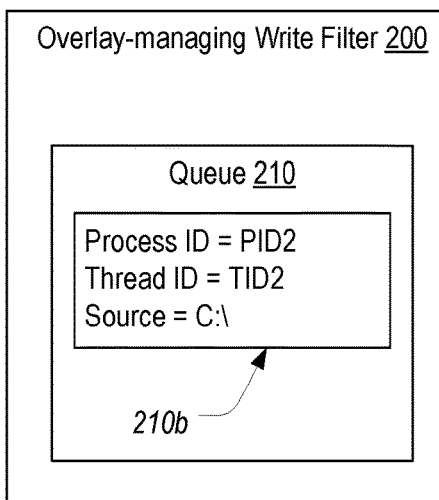
Figure 6B:
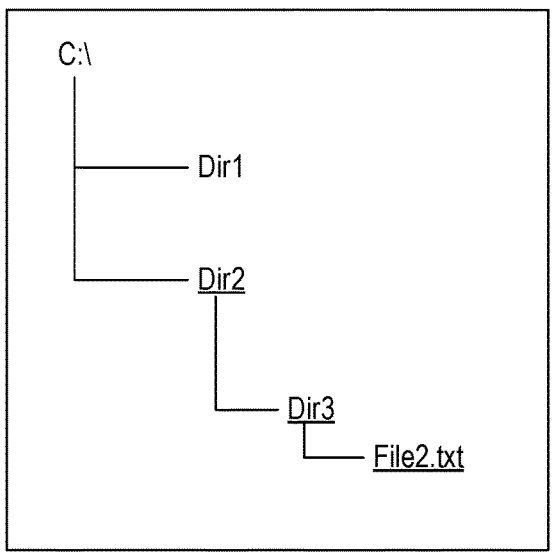
Figure 6B:
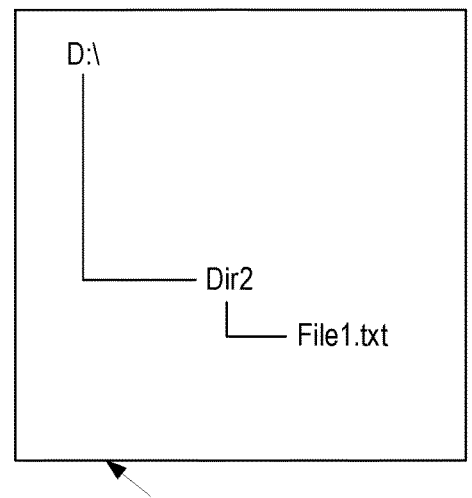

In step 2 shown in FIG. 6B, overlay-managing write filter 200 similarly obtains the thread ID and process ID of IRP 601, which are assumed to be TID2 and PID2 respectively, and creates an entry 210b in queue 210 for storing these IDs in association with the source volume. It is noted that overlay-managing write filter 200 would have modified IRP 601 to target File1.txt in overlay cache 240 (e.g., by modifying the path to D:\Dir2\File1.txt), but the source volume is still C:\ as reflected in entry 210b. Accordingly, FIG. 6B shows that overlay-managing write filter 200 has reverted the file path to C:\Dir2\File1.txt as part of completed IRP 601.

Figure 6C:
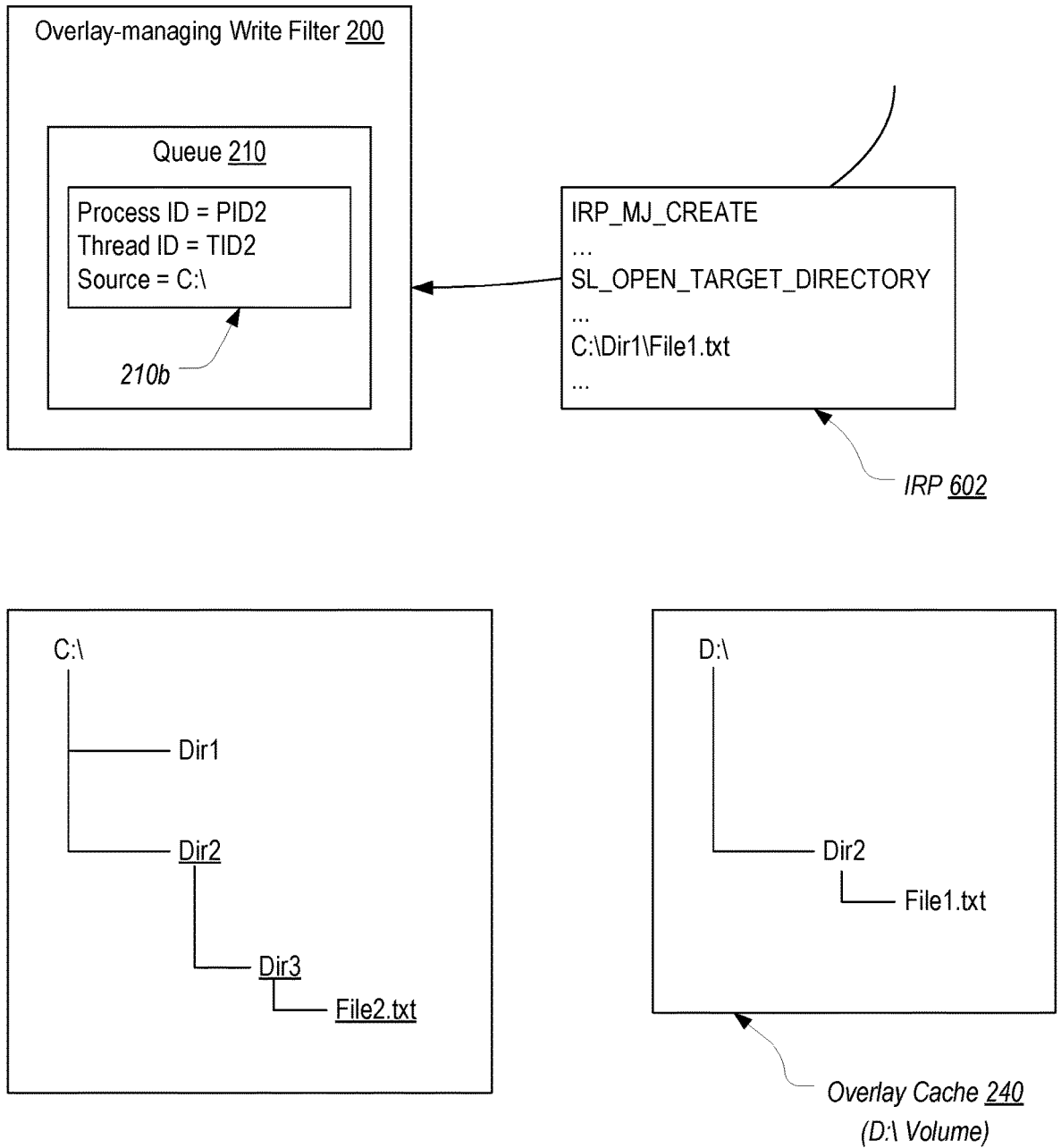
Figure 6D:
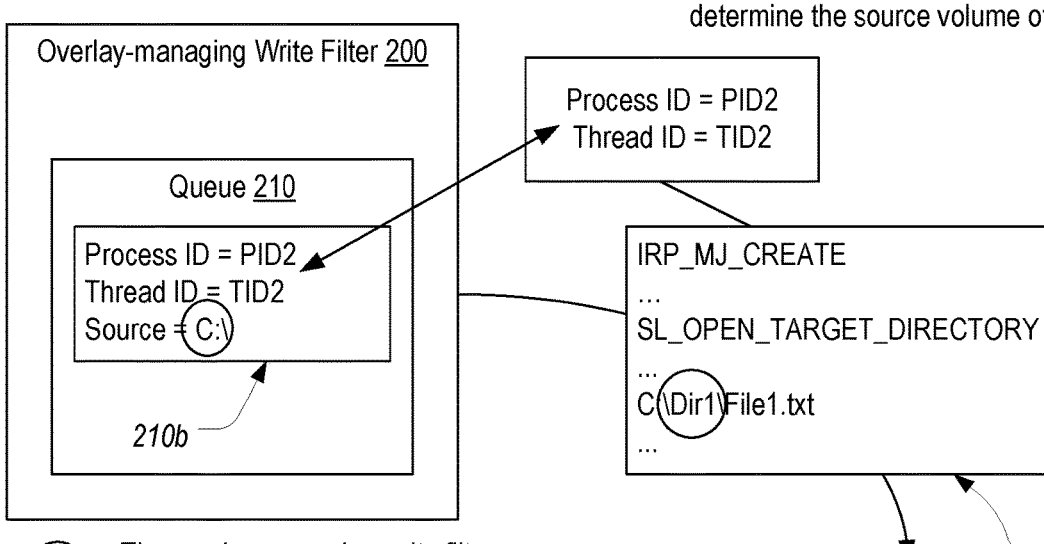
Figure 6D:
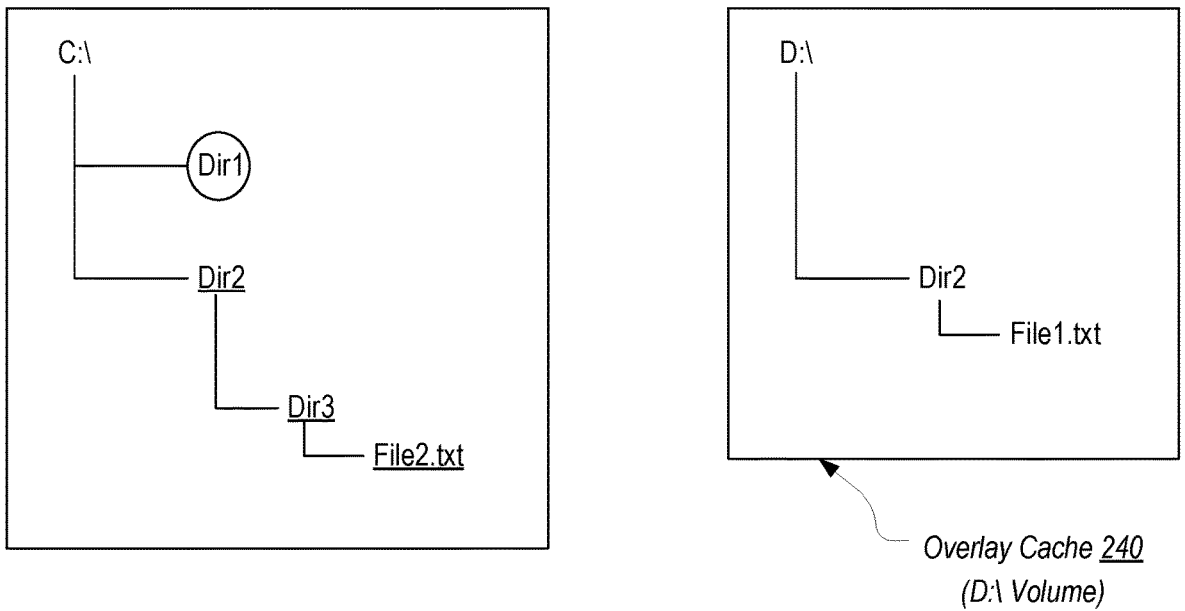

Step 3 of FIG. 6C is similar to step 3 of FIG. 5C in that a subsequent IRP 602, which is an IRP_MJ_CREATE operation, is passed to overlay-managing write filter 200's pre operation callback function. As described above, overlay-managing write filter 200 can determine whether the SL_OPEN_TARGET_DIRECTORY flag is set. If so, in step 4a shown in FIG. 6D, overlay-managing write filter 200 can then determine to which volume IRP 602 pertains. For example, when the pre operation callback function is invoked, the filter manager component of I/O manager 120 will provide a FLT_RELATED_OBJECTS structure that includes a volume pointer that uniquely identifies the volume with which IRP 602 is associated. By accessing this volume pointer, overlay-managing write filter 200 can determine that IRP 602 pertains to the D:\ volume (i.e., overlay cache 240).

If overlay-managing write filter 200 determines that IRP 602 represents a move from the D:\ volume, in step 4b, overlay-managing write filter 200 can then obtain the thread ID and process ID associated with IRP 602 and use the IDs to identify the matching entry 210b in queue 210. From entry 210b, overlay-managing write filter 200 can determine that the source volume of this move is the C:\ volume. Then, in step 4c, overlay-managing write filter 200 can determine whether the target folder of IRP 602 exists on the source volume. As described above, this can be accomplished using the FltCreateFileEx2 or similar function to attempt to open the C:\Dir1 directory. In this example, overlay-managing write filter 200 will determine that Dir1 exists on the C:\ volume.

Figure 6E:
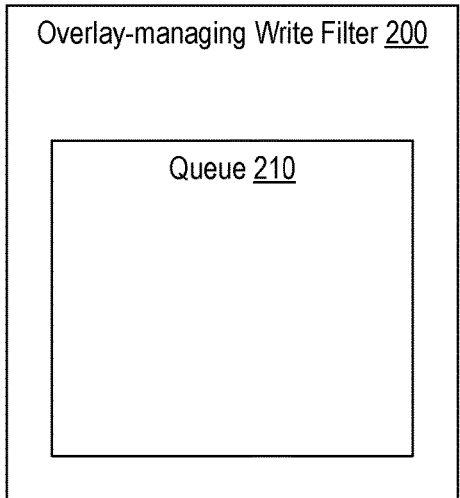
Figure 6E:
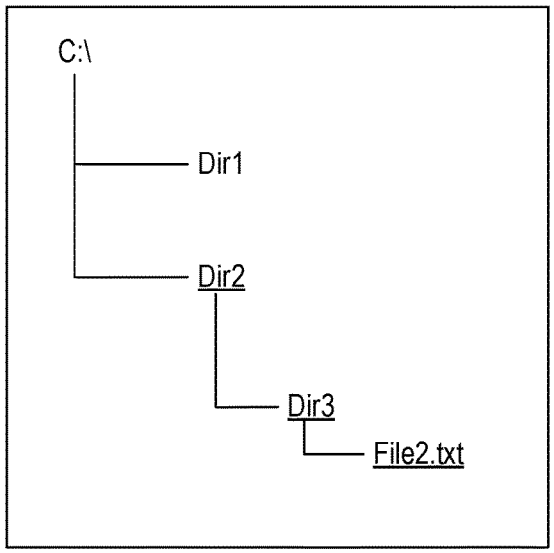
Figure 6E:
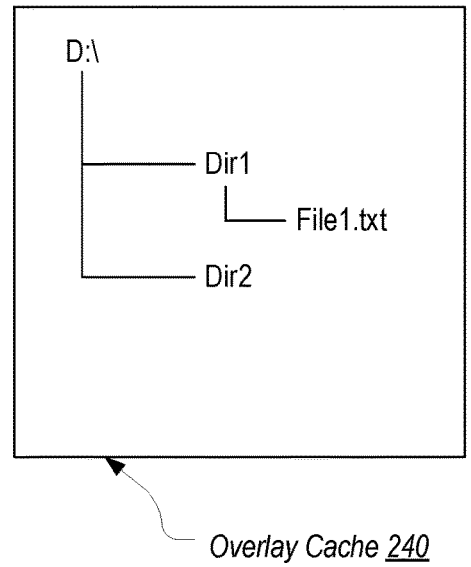

Finally, to prevent File1.txt from being copied to the C:\ volume, overlay-managing write filter 200 can create a copy of the Dir1 folder in overlay cache 240 and then move File1.txt to this newly created folder as shown in step 5 of FIG. 6E. Notably, because File1.txt already existed on the D:\ volume, moving File1.txt to the Dir1 folder on the D:\ volume entails only updating the file system data structure. Also, because of overlay-managing write filter 200, File1.txt will still appear to the user as if it were stored at C:\Dir1\File1.txt.

Figure 7:
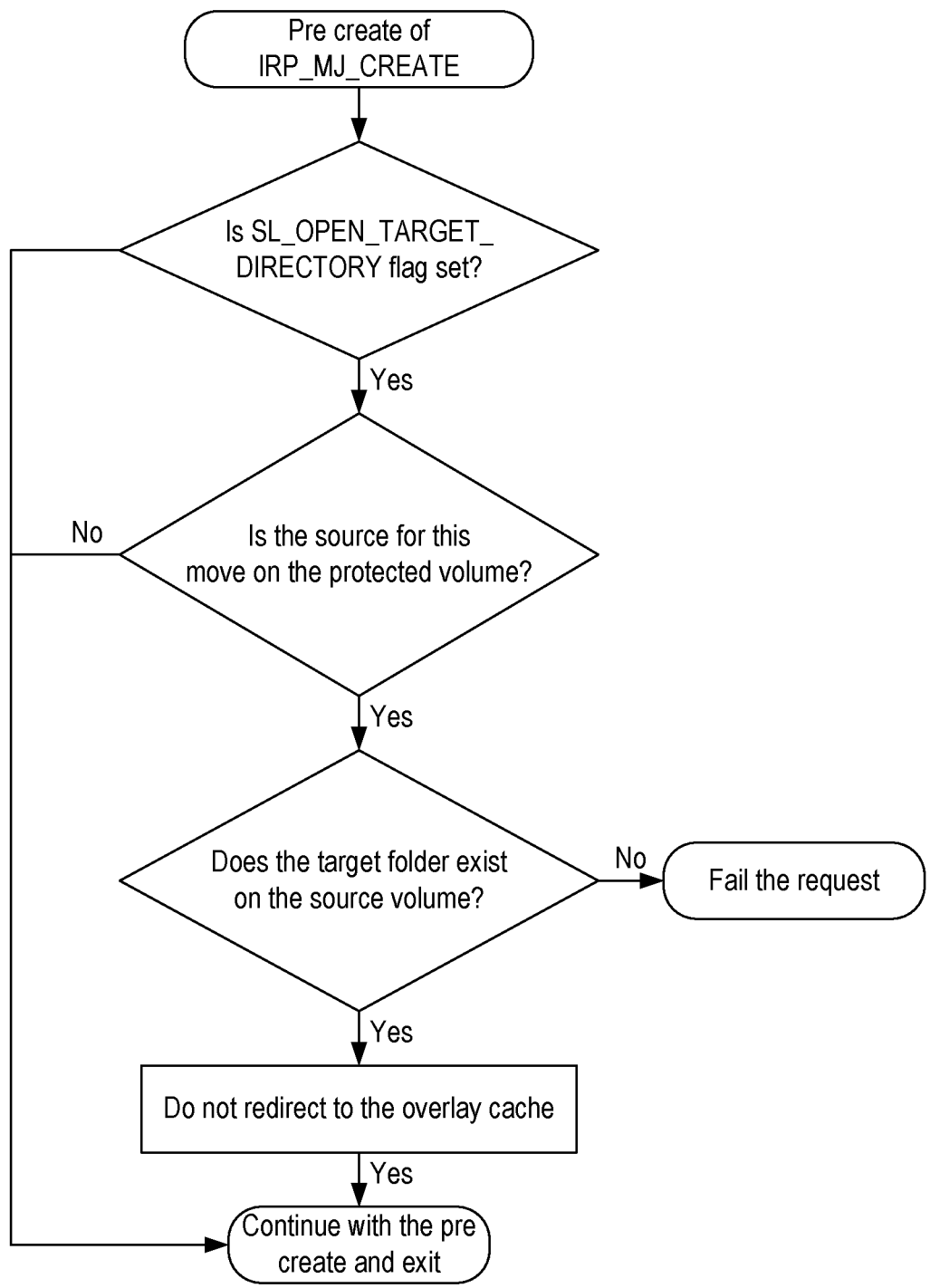
FIGS. 7 and 8 provide flow diagrams corresponding to FIGS. 5A-5E and 6A-6E respectively.
Figure 8:
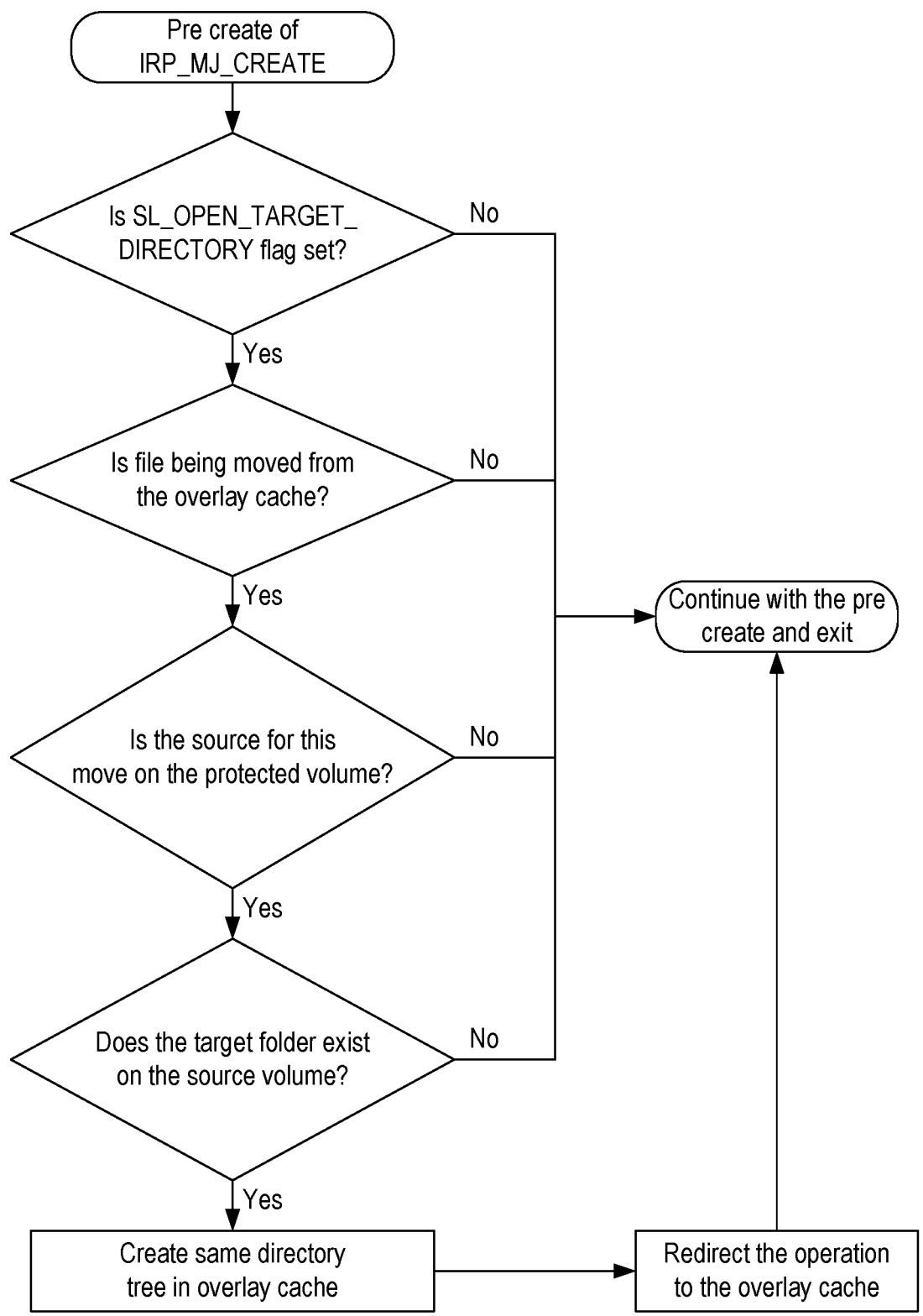

FIGS. 7 and 8 provide flow diagrams that correspond with FIGS. 5A-5E and 6A-6E respectively. As shown in FIG. 7, when overlay-managing write filter 200 receives an IRP_MJ_CREATE operation, it can step through three determinations to verify whether the IRP_MJ_CREATE pertains to an attempt to move a file across volumes to the overlay cache. If (1) the SL_OPEN_TARGET_DIRECTORY flag is set, (2) a matching entry in queue 210 indicates that the source volume for this move is the protected volume, and (3) the target folder exists on the source volume, overlay-managing write filter 200 will forgo redirecting the IRP_MJ_CREATE to the overlay cache thereby preventing a cross-volume move.

As shown in FIG. 8, overlay-managing write filter 200 can perform similar determinations to identify when an IRP_MJ_CREATE pertains to an attempt to move a file across volumes to overlay 140. If (1) the SL_OPEN_TARGET_DIRECTORY flag is set, (2) the volume associated with the IRP is the overlay cache volume, (3) a matching entry in queue 210 indicates that the source volume for this move is the protected volume, and (4) the target folder exists on the source volume, overlay-managing write filter 200 can create a directory tree in overlay cache 240 that matches the target folder directory tree and then redirect the IRP_MJ_CREATE to the newly created folder in overlay cache 240 thereby preventing a cross-volume move.

In summary, overlay-managing write filter 200 can employ a technique for linking the two IRP_MJ_CREATE operations that occur when a file is moved. By linking the two operations, overlay-managing write filter 200 can determine that the second IRP_MJ_CREATE operation pertains to a cross-volume move and can then prevent the cross-volume move from being performed.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay optimizer, for preventing a cross-volume move, the method comprising:

receiving a second input/output (I/O) operation for creating a file in a folder;
determining that the second I/O operation represents a move operation such that the file to be created in the folder is a copy of a file that exists on a source volume;
in response to determining that the second I/O operation represents a move operation, determining that the source volume is a protected volume that is protected from modification by a write filter and determining that the folder exists on the source volume; and
in response to determining that the source volume is a protected volume that is protected from modification by a write filter and that the folder exists on the source volume, causing the second I/O operation to be completed without performing a cross-volume move.

2. The method of claim 1, wherein causing the second I/O operation to be completed without performing a cross-volume move comprises forgoing redirection of the second I/O operation to a separate volume on which an overlay cache is implemented.

3. The method of claim 2, wherein the second I/O operation is an IRP_MJ_CREATE operation and determining that the second I/O operation represents a move operation comprises determining that the SL_OPEN_TARGET_DIRECTORY flag is set in the IRP_MJ_CREATE operation.

4. The method of claim 2, wherein determining that the source volume is a protected volume that is protected from modification by a write filter comprises:
receiving a first I/O operation for opening a file that exists on the source volume;
obtaining one or more identifiers associated with the first I/O operation and storing an association between the one or more identifiers and the source volume;
in response to receiving the second I/O operation, obtaining one or more identifiers associated with the second I/O operation;
determining that the one or more identifiers associated with the second I/O operation match the one or more identifiers associated with the first I/O operation; and
determining that the source volume associated with the one or more matching identifiers is the protected volume.

5. The method of claim 1, further comprising:
determining that the second I/O request is associated with a separate volume on which an overlay cache is implemented.

6. The method of claim 5, wherein causing the second I/O operation to be completed without performing a cross-volume move comprises:
creating a copy of the folder on a separate volume on which an overlay cache is implemented; and
redirecting the second I/O operation to cause the file to be moved to the copy of the folder that was created on the separate volume.

7. The method of claim 6, wherein creating the copy of the folder comprises creating a directory tree that contains the copy of the folder, the directory tree matching a directory tree containing the folder on the source volume.

8. The method of claim 5, wherein determining that the second I/O request is associated with the separate volume on which the overlay cache is implemented comprises accessing a FLT_RELATED_OBJECTS structure associated with the second I/O operation.

9. The method of claim 5, wherein determining that the second I/O operation represents a move operation comprises determining that the second I/O operation is an IRP_MJ_CREATE operation that has the SL_OPEN_TARGET_DIRECTORY flag set.

10. The method of claim 5, wherein determining that the source volume is a protected volume that is protected from modification by a write filter comprises:
receiving a first I/O operation for opening a file that exists on the source volume;
obtaining one or more identifiers associated with the first I/O operation and storing an association between the one or more identifiers and the source volume;
in response to receiving the second I/O operation, obtaining one or more identifiers associated with the second I/O operation;
determining that the one or more identifiers associated with the second I/O operation match the one or more identifiers associated with the first I/O operation; and
determining that the source volume associated with the one or more matching identifiers is the protected volume.

11. A method, performed by an overlay optimizer that includes an overlay-managing write filter, for preventing a cross-volume move from being performed when a file is moved from a folder that exists on a protected volume to a folder that exists on an overlay cache implemented on a separate volume, the method comprising:
receiving a first input/output (I/O) operation that attempts to open a file stored in a first folder;
obtaining a process ID associated with the first I/O operation;
determining a source volume where the file is stored and storing an association between the process ID and the source volume;
receiving a second I/O operation that attempts to create a file in a second folder;
obtaining a process ID associated with the second I/O operation;
determining that the process ID associated with the second I/O operation matches the process ID associated with the first I/O operation;
determining that the source volume is a protected volume;
determining whether the second folder exists on the protected volume such that:
when the second folder exists on the protected volume, the overlay optimizer allows the second I/O operation to create the file in the second folder on the protected volume;
whereas
when the second folder does not exist on the protected volume, the overlay optimizer redirects the second I/O operation to cause the file to be created in an overlay cache implemented on a separate volume.

12. The method of claim 11, wherein the first and second I/O operations are IRP_MJ_CREATE operations.

13. The method of claim 12, wherein obtaining the process ID comprises obtaining a thread ID and then employing the thread ID to obtain the process ID.

14. The method of claim 11, wherein receiving the second I/O operation that attempts to create the file in the second folder comprises determining that the second I/O operation pertains to a move operation.

15. The method of claim 11, wherein determining whether the second folder exists on the protected volume comprises attempting to open the second folder on the protected volume.

16. A method, performed by an overlay optimizer that includes an overlay-managing write filter, for preventing a cross-volume move from being performed when a file is moved to a folder that exists on a protected volume from a folder that exists on an overlay cache implemented on a separate volume, the method comprising:

receiving a first input/output (I/O) operation that attempts to open a file stored in a first folder;

obtaining a process ID associated with the first I/O operation;

determining a source volume where the file is stored and storing an association between the process ID and the source volume;

receiving a second I/O operation that attempts to create a file in a second folder;

determining that the second I/O operation is associated with the separate volume on which the overlay cache is implemented;

obtaining a process ID associated with the second I/O operation;

determining that the process ID associated with the second I/O operation matches the process ID associated with the first I/O operation;

determining that the source volume is the protected volume;

determining that the second folder exists on the protected volume;

creating the second folder on the separate volume; and modifying the second I/O operation to cause the file to be created in the second folder on the separate volume rather than in the second folder on the protected volume.

17. The method of claim 16, wherein the first and second I/O operations are IRP_MJ_CREATE operations.

18. The method of claim 16, wherein receiving the second I/O operation that attempts to create the file in the second folder comprises determining that the second I/O operation pertains to a move operation.

19. The method of claim 16, wherein modifying the second I/O operation comprises modifying a file path in the second I/O operation.

20. The method of claim 16, wherein creating the second folder on the separate volume comprises creating a directory tree that includes the second folder, the created directory tree matching a directory tree that includes the second folder on the protected volume.

* * * * *